(12) United States Patent
Katano

(10) Patent No.: US 10,717,910 B2
(45) Date of Patent: Jul. 21, 2020

(54) COLD STORAGE MATERIAL COMPOSITION, COLD STORAGE MATERIAL, AND TRANSPORT CONTAINER

(71) Applicant: Kaneka Corporation, Osaka (JP)

(72) Inventor: Chiaki Katano, Osaka (JP)

(73) Assignee: KANEKA CORPORATION, Osaka (JP)

( * ) Notice: Subject to any disclaimer, the term of this patent is extended or adjusted under 35 U.S.C. 154(b) by 293 days.

(21) Appl. No.: 15/841,774

(22) Filed: Dec. 14, 2017

(65) Prior Publication Data

US 2018/0105728 A1  Apr. 19, 2018

Related U.S. Application Data

(63) Continuation of application No. PCT/JP2016/068152, filed on Jun. 17, 2016.

(30) Foreign Application Priority Data

Jun. 19, 2015 (JP) .................. 2015-124260

(51) Int. Cl.
*C09K 5/06* (2006.01)
*B65D 81/38* (2006.01)

(52) U.S. Cl.
CPC ............... *C09K 5/066* (2013.01); *C09K 5/06* (2013.01); *B65D 81/3813* (2013.01); *Y02E 60/147* (2013.01)

(58) Field of Classification Search
CPC ....... C09K 5/06; C09K 5/066; B65D 81/3813
See application file for complete search history.

(56) References Cited

U.S. PATENT DOCUMENTS

| | | | | |
|---|---|---|---|---|
| 5,348,080 A * | 9/1994 | Kuroda | .................. | C09K 5/063 165/104.12 |
| 6,469,085 B1 | 10/2002 | Mizutani | | |
| 9,096,787 B2 * | 8/2015 | Rowley | .................. | C09K 3/185 |
| 9,845,420 B2 * | 12/2017 | MacHida | ............... | C09K 5/063 |
| 2005/0133757 A1 | 6/2005 | Umemoto | | |

FOREIGN PATENT DOCUMENTS

| | | | |
|---|---|---|---|
| CN | 102732227 A | * | 10/2012 |
| CN | 104726071 A | * | 6/2015 |
| JP | S57-153077 A | | 9/1982 |
| JP | 62030182 A | * | 2/1987 |
| JP | H02-238277 A | | 9/1990 |
| JP | 03281593 A | * | 12/1991 |
| JP | 06050686 A | * | 2/1994 |
| JP | 07026250 A | * | 1/1995 |
| JP | H07-26250 A | | 1/1995 |
| JP | 11035933 A | * | 2/1999 |
| JP | 11335660 A | * | 12/1999 |
| JP | H11-349936 A | | 12/1999 |
| JP | 2000144123 A | * | 5/2000 |
| JP | 2000-351963 A | | 12/2000 |
| JP | 2002071248 A | * | 3/2002 |
| JP | 2002-139272 A | | 5/2002 |
| JP | 2002-265936 A | | 9/2002 |
| JP | 2002371269 A | * | 12/2002 |
| JP | 2003-41242 A | | 2/2003 |
| JP | 2003-171657 A | | 6/2003 |
| JP | 2004307772 A | * | 11/2004 |
| JP | 2006-335940 A | | 12/2006 |
| JP | 2014-070141 A | | 4/2014 |
| JP | 2015-067651 A | | 4/2015 |
| JP | 2015067651 A | * | 4/2015 |
| WO | WO-2014091938 A1 | * | 6/2014 ............. C09K 5/063 |

OTHER PUBLICATIONS

International Search Report issued in International Application No. PCT/JP2016/068152; dated Jul. 19, 2016 (2 pages).
International Preliminary Report on Patentability issued in International Application No. PCT/JP2016/068152; dated Dec. 28, 2017 (8 pages).

* cited by examiner

*Primary Examiner* — Anthony J Green
(74) *Attorney, Agent, or Firm* — Osha Liang LLP

(57) ABSTRACT

A cold storage material composition includes 1 mol % to 10 mol % of a metal salt; and 0.5 mol % to 5 mol % of an inorganic salt, wherein a eutectic point of the metal salt and water is −75° C. to −40° C., wherein a eutectic point of the inorganic salt and water is −30° C. or higher, and wherein the cold storage material composition is an aqueous solution and has a melting start point within a range from −75° C. to −40° C.

11 Claims, 3 Drawing Sheets

COLD STORAGE MATERIAL COMPOSITION, COLD STORAGE MATERIAL, AND TRANSPORT CONTAINER

TECHNICAL FIELD

One or more embodiments of the present invention relate to (i) a cold storage material composition for controlling a temperature of an article, (ii) a cold storage material including the cold storage material composition, and (iii) a transport container including the cold storage material. More specifically, one or more embodiments of the present invention relate to (i) a cold storage material composition which is repeatedly used to store or transport an article (e.g., pharmaceutical product, medical device, specimen, organ, chemical substance, food, or the like) while maintaining a temperature of the article within a certain low temperature range and which can substitute for dry ice, (ii) a cold storage material in which the cold storage material composition is used, and (iii) a transport container including the cold storage material.

BACKGROUND

Some of pharmaceutical products, specimens, and the like used in medical facilities such as hospitals and the like and some of foods and the like available in supermarkets and the like need to be kept cold or warm within a certain temperature range during transportation so that their qualities are maintained.

As a method of keeping such articles (e.g., pharmaceutical products, specimens, foods, and the like) cold or warm, there has conventionally been known a method in which (i) a cold storage material or a heat storage material, which has been solidified or melted in advance, is placed in a transport container having a thermal insulation property and (ii) latent heat of the cold storage material or the heat storage material are utilized to keep the article cold or warm while the article is housed in the transport container.

In a case where an article, which is intended to be kept cold or warm (hereinafter, such an article may be referred to "temperature control target article"), is to be maintained within a certain temperature range (hereinafter, such a temperature range may be referred to "controlled temperature") for a long period of time, it is necessary to use a cold storage material or a heat storage material which (i) has a melting point within the certain temperature range and (ii) has great latent heat of melting.

Among such cold storage materials, a cold storage material, in which a cooling medium is an inorganic material such as inorganic salt, inorganic hydrate, or the like has the following advantages compared to a cold storage material in which an organic material is used: (i) a quantity of latent heat of melting is larger, (ii) a thermal conductivity is greater, (iii) a volume change is smaller, (iv) nonflammability is greater, (v) and the like.

Meanwhile, in a case where an article such as a pharmaceutical product, a medical device, a specimen, an organ, a chemical substance, food, or the like is to be transported in a frozen state, it is sometimes necessary to maintain the article at a controlled temperature ranged from −75° C. to −40° C. Dry ice has conventionally been used as a cold storage material, and is inexpensive and versatile. However, dry ice is treated as a hazardous material so as to be limited in the amount to be used particularly in a case of air transportation, and the like. This is because dry ice expands in volume when sublimating.

Examples of a cold storage material that can be used in a low temperature range other than dry ice include a cold storage material obtained by mixing water and an organic solvent having a low melting point, such as acetone and the like. However, as described above, an organic material is inferior to an inorganic material in terms of (i) a quantity of latent heat of melting and (ii) heat conductivity. In addition, an organic material is flammable and is therefore a hazardous material in many cases. An organic material is therefore hardly a safe and effective cold storage material.

Meanwhile, there has also been disclosed a cold storage material in which an inorganic salt that produces a eutectic mixture with water within or near the low temperature range is used.

For example, Patent Literature 1 discloses a cold storage material composition having a melting point of −46.7° C. This cold storage material composition is obtained by mixing a calcium chloride as an inorganic salt with water in an amount of 30% by weight (6.4 mol %) relative to the water, and a eutectic point of the calcium chloride with water is −55° C.

Meanwhile, Patent Literature 2 discloses a cold storage material composition having a melting point of −47.5° C. This cold storage material composition is obtained by (i) mixing calcium chloride in water in an amount of 15% by weight (i.e., 1.3 mol % after mixing) and (ii) mixing magnesium chloride (whose eutectic point with water: −33.6° C.) in the water in an amount of 5% by weight (i.e., 0.5 mol % after mixing).

CITATION LIST

Patent Literature

[Patent Literature 1]
Japanese Patent Application Publication No. 7-26250 (Publication date: Jan. 27, 1995)
[Patent Literature 2]
Japanese Patent Application Publication No. 2003-41242 (Publication date: Feb. 13, 2003)

The inventors subjected the above-described cold storage material, which contained water and calcium chloride, to an experiment simulating actual use. As a result, it was found that such a conventional cold storage material containing water and calcium chloride is insufficient as a cold storage material to substitute for practical dry ice.

SUMMARY

One or more embodiments of the present invention provide (i) a cold storage material composition which is used to store or transport an article while the article is stabilized within a low temperature range (i.e., certain temperature range) from −75° C. to −40° C. with good repeatability even after solidification and melting are repeated and which can substitute for dry ice, (ii) a cold storage material including the cold storage material composition, and (iii) a transport container including the cold storage material.

The inventors conducted diligent study and found the following: A cold storage material composition, which (i) can maintain a certain melting point within a range of its eutectic point from −75° C. to −40° C. with good repeatability, (ii) has less variation in melting point and melting behavior, and (iii) can stably achieve cold storage, can be obtained by using, as a cooling medium, an aqueous mixed solution containing: a metal salt (A) whose eutectic point with water is −75° C. to −40° C.; and an inorganic salt (B)

whose eutectic point with water is −30° C. or higher. This is because the use of such a mixed solution causes the inorganic salt (B) to effectively allow for eutectics of the metal salt (A) and water.

Specifically, one or more embodiments of the present invention include the following features.

A cold storage material composition which is an aqueous solution containing: a metal salt (A) which is contained at a concentration of 1 mol % to 10 mol % and whose eutectic point with water is −75° C. to −40° C.; and an inorganic salt (B) which is contained at a concentration of 0.5 mol % to 5 mol % and whose eutectic point with water is −30° C. or higher, the cold storage material composition having a melting start point within a range from −75° C. to −40° C.

In one or more embodiments of the present invention, it is possible to provide (i) a cold storage material composition which is used to store or transport an article with good repeatability while a temperature of the article is stabilized within a range from −75° C. to −40° C., which has little volume expansion while being frozen, and which can substitute for dry ice, (ii) a cold storage material including the cold storage material composition, (iii) a transport container including the cold storage material.

DETAILED DESCRIPTION OF EMBODIMENTS

Figure 1:
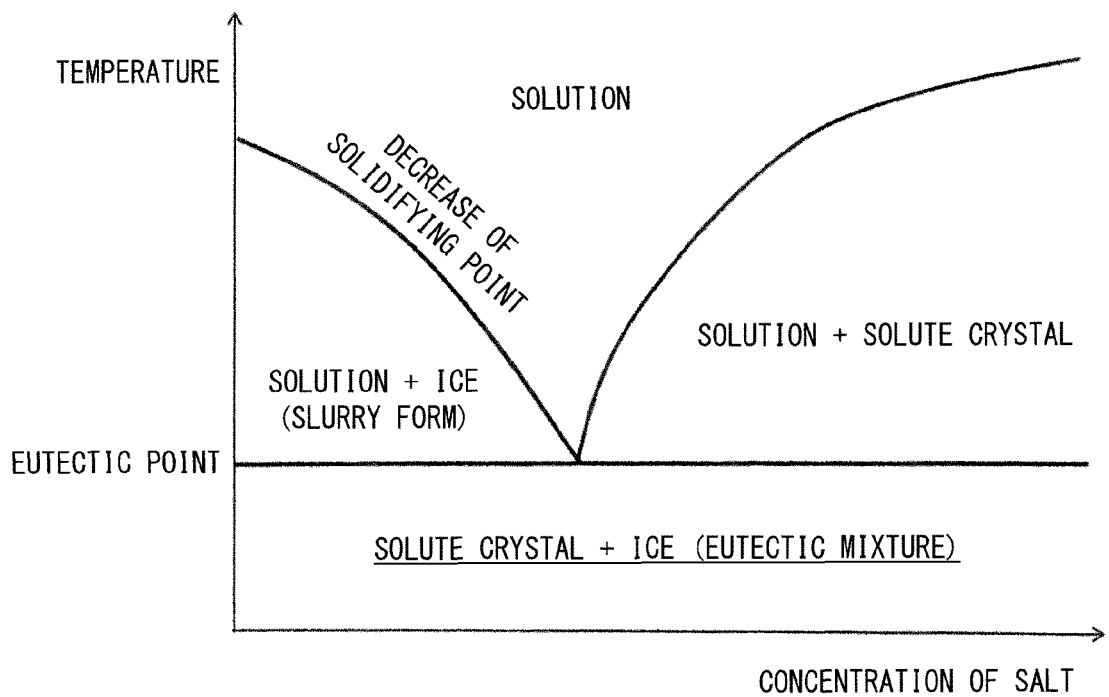
FIG. 1 is a phase equilibrium diagram of an aqueous solution containing inorganic salt. Although water fundamentally solidifies at 0° C., a solidifying point of water, which is contained in an aqueous solution containing inorganic salt, decreases as a result of an increase in concentration at which the inorganic salt is contained in the aqueous solution (see downward curve starting from 0° C. and extending toward bottom right). However, in a case where the concentration, at which the inorganic salt is contained in the aqueous solution, increases and consequently reaches a certain level, the water (i.e., solvent) solidifies concurrently with deposition of the inorganic salt (i.e., solute) (i.e., eutectic mixture is produced). The temperature, at which the eutectic mixture is produced, is called a "eutectic point".

The following description will discuss one or more embodiments of the present invention with reference to specific examples. The present invention is, however, not limited to the examples. The present invention is not limited to any of configurations described below, but can be altered in many ways within the scope of the claims. Embodiments and examples derived from a proper combination of technical means disclosed in different embodiments and examples are also encompassed in the technical scope of the present invention. All patent literatures listed herein are incorporated herein as reference. Any numerical range expressed as "A to B" herein means "not less than A and not more than B" unless otherwise specified.

A cold storage material composition in accordance with the present embodiment can be used in a cold storage material of a latent heat type because the cold storage material composition absorbs thermal energy when a phase state of the cold storage material composition is transitioned from a solidified (solid) state to a molten (liquid) state.

A "melting point" of a cold storage material composition as used herein refers to a temperature at which the cold storage material composition in a solid state starts melting into a liquid state. A "solidifying point" of a cold storage material composition as used herein refers to a temperature at which the cold storage material composition in the liquid state starts solidifying into the solid state.

A "melting point" of a cold storage material including the cold storage material composition (more specifically, a cold storage material constituted by the cold storage material composition) as used herein refers to a temperature of the cold storage material, when a phase state of a major part of the cold storage material starts changing from the solidified (solid) state to the molten (liquid) state. A "solidifying point" of the cold storage material including the cold storage material composition (more specifically, the cold storage material constituted by the cold storage material composition) as used herein refers to a temperature of the cold storage material, when the phase state of the major part of the cold storage material starts changing from the molten (liquid) state to the solidified (solid) state. Note that the "major part" as used herein refers to a part which accounts for substantially more than 50% by weight. For example, in a case where 80% by weight of a cold storage material is in the solid state and 20% by weight of the cold storage material is in the liquid state, the phase state of the cold storage material is regarded as the solidified (solid) state. The "phase state" as used herein refers to a typical state of a solid, a liquid, or a gas.

The cold storage material in accordance with one or more embodiments of the present invention can be used as a cold storage material of the latent heat type, mainly by utilization of the solid state and the liquid state of the cold storage material.

Figure 2:
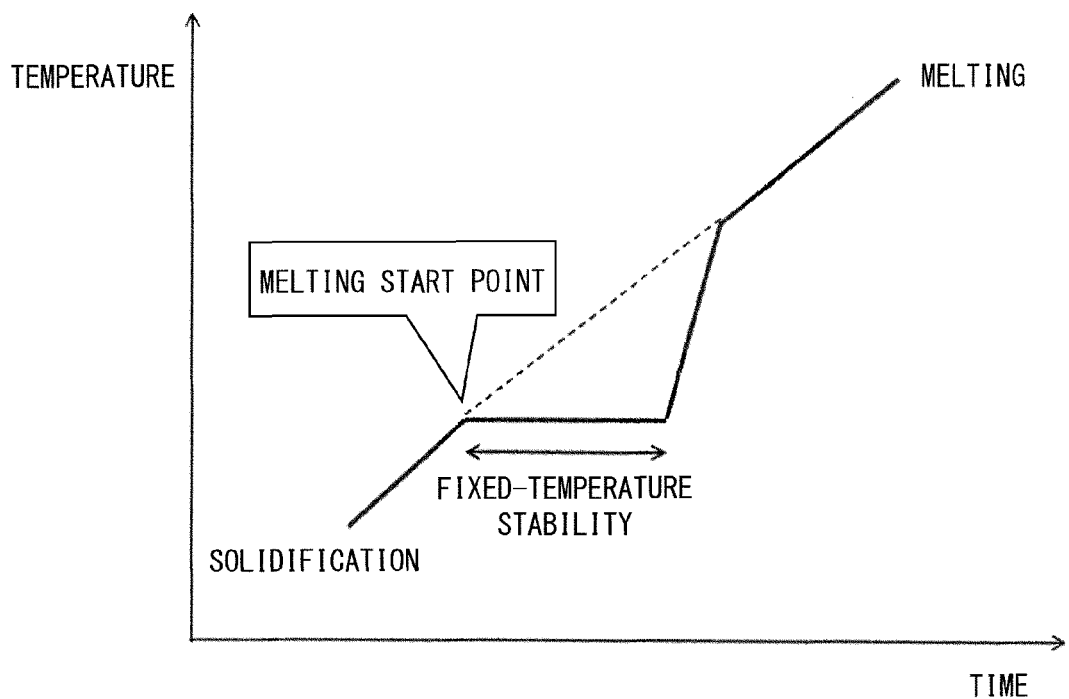
FIG. 2 is a graph plotting a change over time in temperature of a cold storage material composition when the cold storage material composition in a solidified state was heated in an ultracold thermostatic bath at a constant heating rate. In comparison with an atmospheric temperature which continuously increases at a constant rate, the temperature of the cold storage material composition, as shown in FIG. 2, (i) increases at a constant rate until it reaches a certain temperature, (ii) stops changing and starts staying constant at the certain temperature due to latent heat, (iii) stays at the certain temperature for a certain period of time, and (iv) starts increasing again at the constant rate.

FIG. 2 is obtained by plotting a change over time in temperature of the cold storage material composition when the cold storage material composition in the solidified state was heated in an ultracold thermostatic bath at a constant heating rate. In comparison with an atmospheric temperature which continuously increases, there exists a point at which the temperature of the cold storage material composition stops changing and starts staying constant, due to latent heat (hereinafter, such a point may also be referred to as "melting start point"). This melting start point is regarded as the melting point of the cold storage material composition in accordance with one or more embodiments of the present invention.

Note that the term "fixed-temperature stability" in regard to the cold storage material composition in accordance with one or more embodiments of the present invention refers to a state in which a temperature of the cold storage material composition is maintained within a range from the melting start point to a temperature 2.0° C. higher than the melting start point, due to the latent heat of the cold storage material composition. In a case where the cold storage material composition exhibits the fixed-temperature stability, the cold storage material composition is regarded as having fixed-temperature stability.

Next, constituent components in accordance with one or more embodiments of the present invention are discussed below.

1. Cold Storage Material Composition

The cold storage material composition in accordance with one or more embodiments of the present invention is an aqueous solution which contains: a metal salt (A) whose eutectic point with water is −75° C. to −40° C.; and an inorganic salt (B) whose eutectic point with water is −30° C. or higher.

<Metal Salt (A)>

The cold storage material composition in accordance with one or more embodiments of the present invention contains the metal salt (A) whose eutectic point with water is −75° C. to −40° C. Because the cold storage material composition in accordance with one or more embodiments of the present invention contains the metal salt (A), it is possible to realize cold storage within a low temperature range as in a case where dry ice is used as the cold storage material.

Examples of the metal salt (A) used in one or more embodiments of the present invention include calcium chloride, zinc chloride, potassium hydroxide, and the like. These metal salts can be used individually or in combination.

Among those examples, calcium chloride may be used in view of safety, versatility, handling easiness, and the like.

A concentration, at which the metal salt (A) is contained in the cold storage material composition in accordance with one or more embodiments of the present invention, may be 1 mol % to 10 mol %, 2 mol % to 8 mol %, 3 mol % to 7 mol %, or 4 mol % to 6 mol %. This prevents unmelted residues and deposition of salt, and therefore makes it possible to obtain a cold storage material composition which stably has a melting start point within a range from −75° C. to −40° C.

According to a cold storage material composition containing the metal salt (A) at a concentration of 1 mol % or higher, the metal salt (A), whose eutectic point with water is −75° C. to −40° C., accounts for a large proportion in the aqueous solution. This makes it possible to achieve a cold storage behavior in which latent heat of melting is used within the above temperature range. Meanwhile, according to a cold storage material composition containing the metal salt (A) at a concentration of 10 mol % or lower, the metal salt (A) is less likely to be deposited in the cold storage material composition in a case where (i) an aqueous solution of the cold storage material composition is prepared and (ii) the temperature of the cold storage material composition decreases.

<Inorganic Salt (B)>

The cold storage material composition in accordance with one or more embodiments of the present invention contains the inorganic salt (B) whose eutectic point with water is −30° C. or higher.

The inorganic salt (B) effectively allows for eutectics of water and the metal salt (A). Therefore, because the cold storage material composition in accordance with one or more embodiments of the present invention contains the inorganic salt (B) in its aqueous solution, it is possible to stably achieve, with good repeatability, a cold storage behavior in which latent heat of melting is used within a temperature range from −75° C. to −40° C., which is near the eutectic point of the metal salt (A).

Examples of the inorganic salt (B) used in one or more embodiments of the present invention include sodium chloride, ammonium chloride, potassium chloride, ammonium sulfate, potassium nitrite, potassium iodide, sodium hydrate, sodium bromide, and the like. These inorganic salts can be used individually or in combination.

Among those examples, chloride salts such as sodium chloride, ammonium chloride, potassium chloride, and the like may be used in view of repeatability of the melting start point and of the fixed-temperature stability. Sodium chloride is safe and inexpensive, and may be used as the inorganic salt.

A concentration, at which the inorganic salt (B) is contained in the cold storage material composition in accordance with one or more embodiments of the present invention, may be 0.5 mol % to 5 mol % or 0.8 mol % to 4 mol %. This prevents unmelted residues and deposition of salt, and therefore makes it possible to obtain a cold storage material composition which stably has a melting start point within the range from −75° C. to −40° C.

According to a cold storage material composition containing the inorganic salt (B) at a concentration of 0.5 mol % or higher, the inorganic salt (B) accounts for a large proportion in the aqueous solution. In such a case, the cold storage material composition (i) has a certain melting point within the temperature range from −75° C. to −40° C. with good repeatability and (ii) has less variation in melting point and melting behavior, and therefore can stably achieve cold storage. Such a cold storage material composition also has little volume expansion while being frozen. Meanwhile, according to a cold storage material composition containing the inorganic salt (B) at a concentration of 5 mol % or lower, the inorganic salt (B) is less likely to be deposited in the cold storage material composition in a case where (i) the aqueous solution of the cold storage material composition is prepared and (ii) the temperature of the cold storage material composition decreases.

In order to achieve a certain melting point within the temperature range from −75° C. to −40° C. with good repeatability, a ratio of the metal salt (A) to the inorganic salt (B) contained in the cold storage material composition in accordance with one or more embodiments of the present invention may fall within a range of 1:2 (mol:mol) to 8:1 (mol:mol), 1:1 (mol:mol) to 6.5:1 (mol:mol), or 1:1 (mol:mol) to 6:1 (mol:mol).

<Thickener>

The cold storage material composition in accordance with one or more embodiments of the present invention is, as described later, mainly charged into a plastic container, a plastic bag, or the like so as to be formed into a cold storage material. The cold storage material is used while being placed in a transport container. In a case where a container or the like that shapes the cold storage material breaks, the cold storage material composition charged in the container or the like leaks out of the container or the like. The cold storage material composition, which has thus leaked out, may (i) contaminate an expensive temperature control target article, so as to cause the temperature control target article to be unusable and/or (ii) spill out of the transport container, so as to damage an environment.

Therefore, in order to minimize spillage of the cold storage material composition even in a case where a container or the like that is filled with the cold storage material composition breaks during transportation, a thickener may be included in the cold storage material composition in accordance with one or more embodiments of the present invention so that the cold storage material composition has a solid form (gel-like form).

The thickener contained in the cold storage material composition in accordance with one or more embodiments of the present invention is not particularly limited. Examples of the thickener include water-absorbing resin (such as starches, acrylates, povals, carboxymethyl celluloses, and the like), attapulgite clay, gelatin, agar, silica gel, xanthane gum, gum arabic, guar gum, carrageenan, cellulose, konjac, and the like.

The thickener contained in the cold storage material composition in accordance with one or more embodiments of the present invention can be an ionic thickener or a nonionic thickener. Since the cold storage material composition in accordance with one or more embodiments of the present invention contains metal salt and inorganic salt which are each dissolved into an ionic state, it may be possible to select a nonionic thickener that does not affect ions dissolved in the cold storage material composition.

Examples of the nonionic thickener used in one or more embodiments of the present invention include guar gum, dextrin, polyvinyl pyrrolidone, hydroxyethyl cellulose, and the like.

Depending on the respective concentrations at which the metal salt (A) and the inorganic salt (B) are contained in the cold storage material composition in accordance with one or more embodiments of the present invention, the metal salt (A) and/or the inorganic salt (B) may be deposited over time due to a change in temperature. However, in a case where the cold storage material composition in accordance with one or more embodiments of the present invention contains a thickener, the thickener not only allows the cold storage material composition to have the gel-like form but also allows the metal salt (A) and the inorganic salt (B), dissolved in the aqueous solution, to be effectively dispersed. This makes it possible to prevent the metal salt (A) and the inorganic salt (B) from being deposited.

Among the examples of the thickener, nonionic thickeners that do not affect metallic ions and inorganic ions dissolved in the cold storage material composition may be used. Among such nonionic thickeners, hydroxyethyl cellulose which is excellent in gel stability and environmental adaptability may be used.

In a case where the cold storage material composition in accordance with one or more embodiments of the present invention contains the thickener, (i) the thickener does not affect a melting/solidifying behavior of the cold storage material composition and (ii) the thickener allows the cold storage material composition to maintain a large quantity of latent heat of melting. Because the cold storage material composition in accordance with one or more embodiments of the present invention contains the thickener, (i) the cold storage material composition is prevented from separating into a solid phase and a liquid phase even after a heat cycle test is carried out under an environmental temperature at which the cold storage material composition is expected to be used, (ii) it is possible to reduce an environmental load in a case of leakage of the cold storage material composition, and (iii) it is possible to reduce a workload in a case of collection of the cold storage material composition.

Although an optimal amount of thickener to be added varies depending on which type of the thickener is to be used, the thickener may be ordinarily added in an amount of 0.1 parts by weight to 10 parts by weight or 0.2 parts by weight to 5 parts by weight, relative to 100 parts by weight of the aqueous solution in which the metal salt (A) and the inorganic salt (B) are dissolved. This is because, with such amounts, (i) aggregation and deposition of salt dissolved in the cold storage material composition can be prevented, (ii) a special pump or the like is unnecessary during delivery of the cold storage material composition, and (iii) handling of the cold storage material composition is good. By adding 0.2 parts by weight to 5 parts by weight of hydroxyethyl cellulose to the cold storage material composition, it is possible to obtain a transparent gel having a low fluidity.

<Others>

As necessary, the cold storage material composition in accordance with the present embodiment can contain, other than the components above, a crystal nucleating agent, a perfume, a colorant, an antibacterial agent, a high molecular polymer, and other organic/inorganic compounds.

<Production Method>

A method of preparing the aqueous solution containing the metal salt (A) and the inorganic salt (B) in accordance with one or more embodiments of the present invention is not particularly limited, and can be any publicly-known method. For example, the aqueous solution can be prepared by (i) pouring water into a container in which the metal salt (A) and the inorganic salt (B) have been mixed in advance by use of a tumbler mixer, a ribbon blender, or the like and (ii) stirring a resultant mixture by use of a mixer or the like while cooling the container.

2. Cold Storage Material

It is sufficient that the cold storage material in accordance with one or more embodiments of the present invention includes the above-described cold storage material composition. Other components, materials, and the like of the cold storage material are not limited.

The cold storage material in accordance with one or more embodiments of the present invention can be obtained by, for example, charging the above-described cold storage material composition in a container, a bag, or the like.

The container or the bag may be made mainly of synthetic resin in order to prevent the cold storage material composition from leaking out due to rusting and corrosion caused by an aqueous solution containing inorganic salt. A material of the container or the bag to be filled with the cold storage material composition in accordance with one or more embodiments of the present invention is not limited to any particular one, and examples of the material include polyvinyl chloride, polyethylene, polypropylene, polyethylene terephthalate, polystyrene, nylon, polyester, or the like.

According to the present invention, (i) only one of the materials can be used alone or (ii) two or more of the materials, which are combined so as to have a multilayer structure, can be used so that thermal resistance and barrier performance are improved. In view of handling easiness and cost, a container or a bag that is made of polyethylene may be used.

Although a shape of the container or the bag is not particularly limited, the container or the bag may have a shape that can secure a large surface area in order to improve a heat exchange efficiency. A cold storage material can be produced by filling the container or the bag with the cold storage material composition that has been solidified or melted in advance.

3. Transport Container

It is sufficient that the transport container in accordance with the present embodiment includes the above-described cold storage material. Other specific components, materials, and the like of the transport container are not particularly limited.

FIG. 3 illustrates an example of the transport container in accordance with one or more embodiments of the present invention.

Figure 3A:
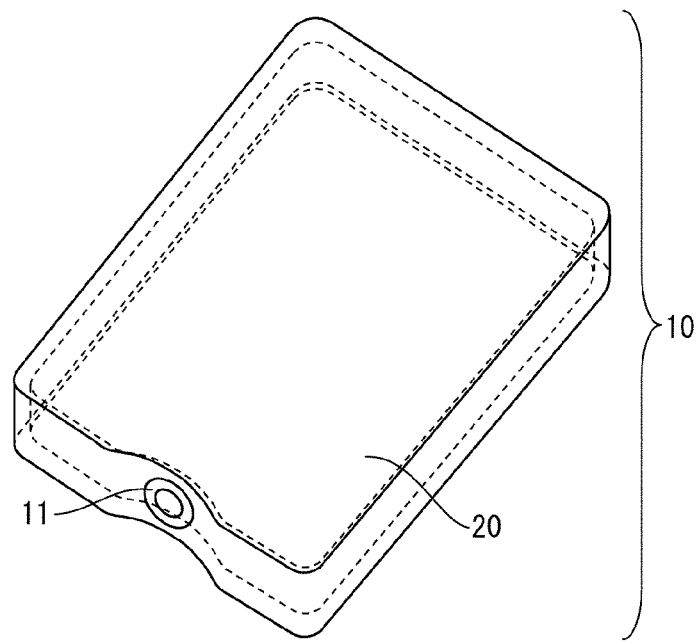
FIG. 3A is a perspective view schematically illustrating an example of a cold storage material in accordance with one or more embodiments of the present invention.
Figure 3B:
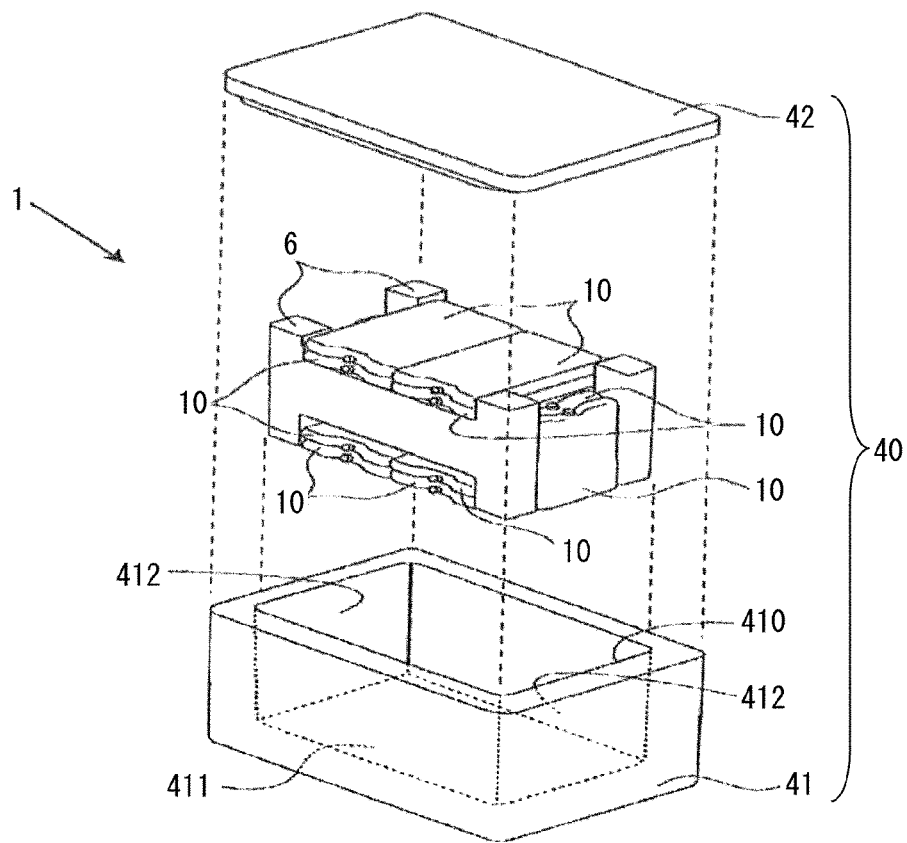
FIG. 3B is an exploded perspective view schematically illustrating an example of a transport container in accordance with one or more embodiments of the present invention.

As illustrated in FIGS. 3A and 3B, a cold storage material 10 in accordance with the present embodiment is filled with a cold storage material composition 20 in accordance with one or more embodiments of the present invention which is charged through where a cap 11 of the cold storage material is provided. The cold storage material 10 can be used while being housed or placed in a transport container 40 in accordance with the present embodiment.

The transport container 40 in accordance with one or more embodiments of the present invention includes, for example, a box 41 and a lid 42 of the box, which lid 42 fits an opening 410 of the box, so as to have a thermal insulation property.

A material of the transport container 40 is not limited to any particular one, provided that the transport container 40 has a thermal insulation property. In view of employing a lightweight and inexpensive material which can prevent dew condensation, it is suitable to employ foamed plastic as the material. Meanwhile, in view of employing a material which is excellent in thermal insulation property, which maintains a temperature for a long period of time, and which can prevent dew condensation, it is suitable to employ a vacuum thermal insulation material as the material. Examples of the foamed plastic include foamed polyurethane, foamed polystyrene, foamed polyethylene, and foamed polypropylene. Examples of a material, of which a core of the vacuum thermal insulation material is made, include silica powder, glass wool, glass fiber, and the like. The transport container 40 can be constituted by a combination of the foamed plastic and the vacuum thermal insulation material. In such a case, a transport container 40 having an excellent thermal insulation property can be obtained by (i) a method in which an outer surface or an inner surface of each of the box 41 and the lid 42 of the box that are made of the foamed plastic is covered with the vacuum thermal insulation material, (ii) a method in which the vacuum thermal insulation material is embedded in walls constituting each of the box 41 and the lid 42 of the box that are made of the foamed plastic, (iii) or the like.

Figure 4A:
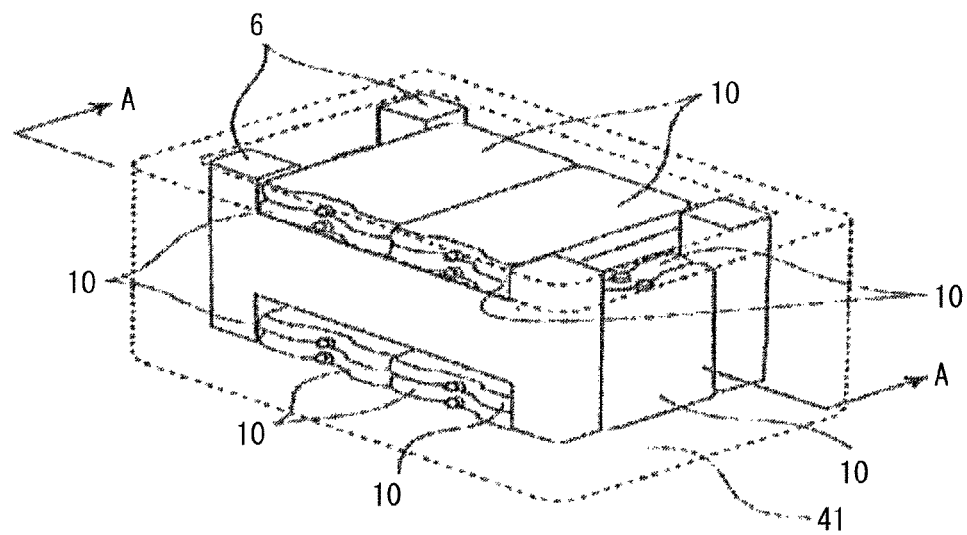
FIG. 4A is a perspective view schematically illustrating an inside of the transport container illustrated in FIG. 3.
Figure 4B:
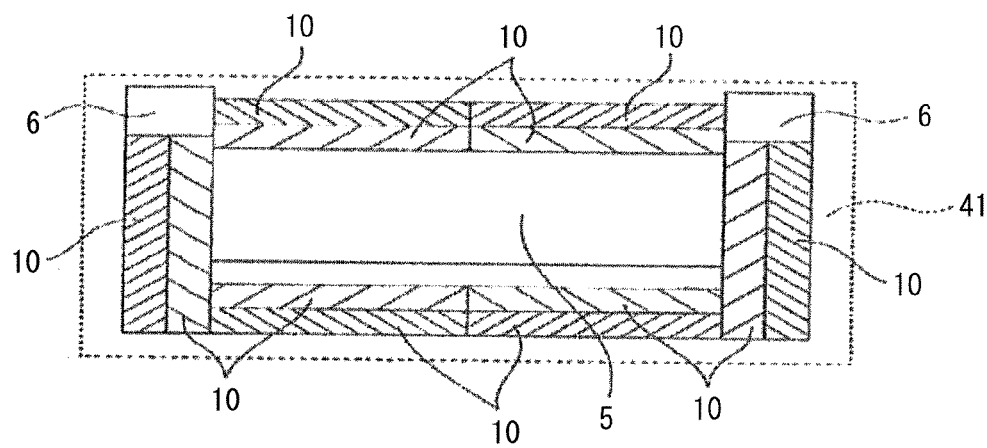
FIG. 4B is a cross-sectional view schematically illustrating a plane taken along the line A-A shown in FIG. 4A.

FIG. 4A is a perspective view schematically illustrating an inside of the transport container 40. FIG. 4B is a cross-sectional view schematically illustrating a plane taken along the line A-A shown in FIG. 4A.

As illustrated in FIGS. 3 and 4, a transport container 1 can include spacers 6 so that (i) a gap between (a) the cold storage material 10 and (b) the inner surface of the lid 42 of the box, a lateral surface 412 of the box, and a bottom surface 411 of the box is filled when the cold storage material 10 is housed or placed in the transport container 1 and (ii) a space 5 for housing a temperature control target article is secured as illustrated in FIG. 4B.

A material of the spacers 6 is not limited to any particular one. Examples of the material include polyurethane, polystyrene, polyethylene, polypropylene, AS resin, ABS resin, and a foamed plastic obtained by foaming such a resin.

According to one or more embodiments of the present invention, a pair of spacers 6 are placed in the transport container 40 so as to face each other. In a case where the transport container 40 in accordance with the present embodiment includes the spacers 6, the cold storage material 10 is fixed in placement. This makes it easier to carry out packing.

With the transport container in accordance with one or more embodiments of the present invention, it is possible to store or transport an article that requires temperature control, while the article is maintained within a range from −75° C. to −40° C. for a long period of time regardless of an ambient temperature. The transport container in accordance with the present embodiment can be suitably used to store or transport various kinds of articles such as pharmaceutical products, medical devices, specimens, organs, chemical substances, food, and the like that require temperature control.

One or more embodiments of the present invention can be configured as follows.

[1] A cold storage material composition which is an aqueous solution containing: a metal salt (A) which is contained at a concentration of 1 mol % to 10 mol % and whose eutectic point with water is −75° C. to −40° C.; and an inorganic salt (B) which is contained at a concentration of 0.5 mol % to 5 mol % and whose eutectic point with water is −30° C. or higher, the cold storage material composition having a melting start point within a range from −75° C. to −40° C.

[2] The cold storage material composition as set forth in [1], the metal salt (A) is calcium chloride.

[3] The cold storage material composition as set forth in [1] or [2], in which the inorganic salt (B) is chloride salt.

[4] The cold storage material composition as set forth in [3], in which the chloride salt is at least one selected from a group consisting of sodium chloride, ammonium chloride, and potassium chloride.

[5] The cold storage material composition as set forth in any one of [1] through [4], further containing a thickener.

[6] The cold storage material composition as set forth in [5], in which the thickener is a nonionic thickener.

[7] The cold storage material composition as set forth in [6], in which the thickener is at least one selected from a group consisting of guar gum, dextrin, polyvinyl pyrrolidone, and hydroxyethyl cellulose.

[8] The cold storage material composition as set forth in [6] or [7], in which the thickener is hydroxyethyl cellulose.

[9] A cold storage material including a cold storage material composition described in any one of [1] through [8].

[10] A transport container including a cold storage material described in [9].

EXAMPLES

The following materials were used in Examples and Comparative Examples.

Metal salt (A): Calcium chloride [Calcium chloride for water content measurement, Eutectic point with water=−55.0° C., Molecular weight=110.98, manufactured by Wako Pure Chemical Industries, Ltd.]

Inorganic salt (B):
Sodium chloride [Sodium chloride, Eutectic point with water=−21.2° C., Molecular weight=58.44, manufactured by Wako Pure Chemical Industries, Ltd.];
Ammonium chloride [Ammonium chloride, Eutectic point with water=−15.4° C., Molecular weight=53.49, manufactured by Yamamoto Seisakusho, Inc.]; and
Potassium chloride [Potassium chloride, Eutectic point with water=−10.9° C., Molecular weight=74.55, manufactured by Wako Pure Chemical Industries, Ltd.]

Inorganic salt (C): Magnesium chloride [Anhydrous magnesium chloride, Eutectic point with water=−33.6° C., Molecular weight=95.21, manufactured by Wako Pure Chemical Industries, Ltd.]

In each of Comparative Examples herein, a magnesium chloride, whose eutectic point with water was −30° C. or lower and was outside a range from −75° C. to −40° C., was used as the inorganic salt (C) instead of the inorganic salt (B).

Measurements and evaluations in Examples and Comparative Examples were carried out under the following conditions and procedures.

<Melting Start Temperature>

A cold storage material composition charged in a cryovial made of polypropylene was allowed to stand still in an ultracold thermostatic bath [Ultracold aluminum block thermostatic bath CRYO PORTER (registered trademark) CS-75CP, manufactured by Scinics Corporation], and was then heated and cooled at a temperature increase/decrease rate of 0.5° C./min, 1.0° C./min, or 2.5° C./min within a temperature range from −80° C. to 25° C.

A change in temperature of the cold storage material composition in the ultracold thermostatic bath as measured during a heating process with respect to time was plotted into FIG. 2 such that (i) a horizontal axis indicates time and (ii) a vertical axis indicates temperature. In comparison with an atmospheric temperature which continuously increases at a constant rate, there existed a point at which the temperature of the cold storage material composition stopped changing due to melting and started staying constant as illustrated in FIG. 2. The point was measured as a melting start point of the cold storage material composition.

<Fixed-Temperature Stability>

In a temperature change plot of the cold storage material composition which plot was obtained through the heating process carried out in the ultracold thermostatic bath, the term "fixed-temperature stability" refers to a state in which the temperature of the cold storage material composition is maintained within a range from the melting start point to a temperature 2.0° C. higher than the melting start point due to latent heat of the cold storage material composition. An evaluation as to whether the cold storage material composition had a fixed-temperature stability and a maintenance time during which the cold storage material composition maintained the fixed-temperature stability are indicated in Tables below. In a case where the cold storage material composition had no fixed-temperature stability, the maintenance time was evaluated as zero (0) minute.

<Repeatability>

In the ultracold thermostatic bath, the cold storage material composition was subjected to 20 cycles of heating and cooling at a constant temperature increase/decrease rate within a temperature range from −80° C. to 25° C. Whether or not the melting start point varied and whether or not the fixed-temperature stability was exhibited were evaluated in each cycle using the following criterions.

Excellent (E): The melting start point was maintained for a certain period of time in all cycles, without variation between the cycles.

Good (G): The melting start point was maintained for a certain period of time at a probability of not less than 80% and less than 100%, without variation between the cycles.

Fair (F): The melting start point was maintained for a certain period of time at a probability of not less than 50% and less than 80%, without variation between the cycles.

Poor (P): The melting start point was maintained for a certain period of time at a probability of less than 50%, without variation between the cycles.

<Volume Expansion>

After completion of a cycle test in which the cold storage material composition was repeatedly subjected to solidification and melting, whether or not the cold storage material composition expanded in volume during solidification was evaluated with use of a container which was filled with the cold storage material composition. The evaluation was carried out as follows: (i) the cold storage material composition charged in a cryovial made of polypropylene was allowed to stand still in the ultracold thermostatic bath [Ultracold aluminum block thermostatic bath CRYO PORTER (registered trademark) CS-75CP, manufactured by Scinics Corporation], (ii) the cold storage material composition was then subjected to 10 cycles of heating and cooling at a temperature increase/decrease rate of 0.5° C./min within the temperature range from −80° C. to 25° C., and (iii) an appearance of the cryovial was visually observed.

<Gelation Stability>

In Examples in which a thickener was added to the cold storage material composition in an amount of 1% by weight, the following were examined: (i) a solubility of the thickener, (ii) a thickening property of the cold storage material composition containing the thickener, and (iii) a decrease in viscosity at room temperature due to repetition of solidification and melting. Then, results were evaluated as follows.

Excellent (E): The solubility was present, the thickening property was present, and no decrease in viscosity was present.

Good (G): The solubility was present, the thickening property was present, and the decrease in viscosity was present.

Fair (F): The solubility was present and no thickening property was present.

Poor (P): No solubility was present (sedimentation was observed).

Note that the viscosity was visually checked.

<Practicality Evaluation>

Based on evaluation criterions described above, one that exhibited good practicality was evaluated as Good (G), one that could be practicable depending on circumstances was evaluated as Fair (F), and one that exhibited poor practicality was evaluated as Poor (P).

Examples 1 Through 7 and Comparative Examples 1 Through 7

In each of Examples 1 through 7 and Comparative Examples 1 through 7, an aqueous solution containing the metal salt (A) and the inorganic salt (B) or the inorganic salt (C) in respective amounts (mol %) shown in Tables 1 and 2 was prepared as the cold storage material composition.

A resultant aqueous solution was measured and evaluated with use of an ultracold thermostatic bath. Results of the evaluation are shown in Tables 1 and 2. Note that only evaluation results of repeatability are shown for the case where the temperature increase/decrease rate was 2.5° C./min.

TABLE 1

|  |  | Eutectic Point With Water (° C.) |  | Example 1 | Example 2 | Example 3 | Example 4 | Example 5 | Example 6 | Example 7 | Comparative Example 1 |
|---|---|---|---|---|---|---|---|---|---|---|---|
| Metal Salt (A) | Calcium Chloride | −55.0 | mol % | 3.8 | 3.7 | 3.7 | 2.4 | 5.6 | 4.2 | 3.8 | 6.5 |
| Inorganic Salt (B) | Sodium Chloride | −21.2 |  | 1.9 | 2.8 | 3.7 | 1.9 | 1.9 | — | — | — |
|  | Ammonium Chloride | −15.4 |  | — | — | — | — | — | 4.4 | — | — |
|  | Potassium Chloride | −10.9 |  | — | — | — | — | — | — | 1.9 | — |
| Inorganic Salt (C) | Magnesium Chloride | −33.6 |  | — | — | — | — | — | — | — | — |
| Evaluation Result | <Temperature Increase/Decrease Rate: 0.5° C./min> | Melting Start Point | ° C. | −49.0 | −49.2 | −48.8 | −50.0 | −50.1 | −52.7 | −50.9 | −52.3 |
|  |  | Fixed-temperature Stability | — | Present | Present | Present | Present | Present | Present | Present | Present |
|  |  | Maintenance Time | min | 18 | 17 | 16 | 15 | 25 | 14 | 16 | 20 |
|  |  | Repeatability | — | E | G | G | G | E | G | E | P |
|  | <Temperature Increase/Decrease Rate: 2.5° C./min> | Repeatability | — | G | G | G | G | E | G | E | P |
|  |  | Volume Expansion | — | None | None | None | None | None | Little | None | Significant |
|  | Practicality Evaluation |  |  | G | G | G | G | G | G | G | P |

As is clear from Table 1, the compositions obtained in respective Examples 1 through 7 each (i) maintained a certain melting point for a long period of time within the range from −75° C. to −40° C. with good repeatability and (ii) had little variation in melting point and melting behavior. Particularly, the composition obtained in Example 5 (i) maintained a certain melting point for a longest period of time and (ii) stably started melting within the range from −75° C. to −40° C. regardless of the temperature increase/decrease rate of the ultracold thermostatic bath. Furthermore, the compositions obtained in respective Examples 1 through 7 also exhibited good results in volume expansion evaluation.

In contrast, a composition obtained in Comparative Example 1, which composition contained calcium chloride only, maintained its melting point within an intended temperature range but exhibited no repeatability. The composition obtained in Comparative Example 1 also exhibited poor results in the volume expansion evaluation.

TABLE 2

|  |  | Eutectic Point With Water (° C.) |  | Comparative Example 2 | Comparative Example 3 | Comparative Example 4 | Comparative Example 5 | Comparative Example 6 | Comparative Example 7 |
|---|---|---|---|---|---|---|---|---|---|
| Metal Salt (A) | Calcium Chloride | −55.0 | mol % | — | — | 0.5 | 5.6 | 0.5 | 1.3 |
| Inorganic Salt (B) | Sodium Chloride | −21.2 |  | 2.0 | — | — | — | 3.3 | — |
|  | Ammonium Chloride | −15.4 |  | — | — | — | — | — | — |
|  | Potassium Chloride | −10.9 |  | — | — | — | — | — | — |
| Inorganic Salt (C) | Magnesium Chloride | −33.6 |  | — | 3.2 | 3.3 | 1.9 | — | 0.5 |
| Evaluation Result | <Temperature Increase/Decrease Rate: 0.5° C./min> | Melting Start Point | ° C. | −21.4 | −32.8 | −34.8 | −50.7 | −23.8 | −51.1 |
|  |  | Fixed-temperature Stability | — | Absent | Present | Present | Present | Absent | Present |
|  |  | Maintenance Time | min | 0 | 9 | 12 | 18 | 0 | 9 |
|  |  | Repeatability | — | E | E | E | E | E | E |
|  | <Temperature Increase/Decrease Rate: 2.5° C./min> | Repeatability | — | E | E | E | P | E | F |
|  | Practicality Evaluation |  |  | P | P | P | P | P | P |

As shown in Table 2, compositions obtained in respective Comparative Examples 2 and 3, which contained only sodium chloride or magnesium chloride as a solute of an aqueous solution, started melting within a temperature range from about −30° C. to −20° C. Therefore, in those compositions, it is difficult to maintain a certain melting point within a low temperature range from −75° C. to −40° C. with good repeatability.

A composition obtained in Comparative Example 4 exhibited good repeatability and good fixed-temperature stability but started melting within a temperature range higher than the range from −75° C. to −40° C., within which the eutectic point of the metal salt (A) falls. This is because the composition contained only a small amount of the metal salt (A) and was thus hardly affected by the metal salt (A).

In a case where the temperature increase/decrease rate of the ultracold thermostatic bath was low (0.5° C./min), a composition obtained in Comparative Example 5 started melting within the low temperature range from −75° C. to −40° C. with good repeatability but exhibited some variation in melting behavior. Meanwhile, in a case where the temperature increase/decrease rate of the ultracold thermostatic bath was high (2.5° C./min), the composition exhibited extremely poor repeatability.

A composition obtained in Comparative Example 6 started melting within a temperature range higher than the range from −75° C. to −40° C., within which the eutectic point of the metal salt (A) falls, because the composition contained only a small amount of the metal salt (A). Moreover, the composition exhibited no fixed-temperature stability.

A composition obtained in Comparative Example 7 was prepared in accordance with Example 6 of Patent Literature 2. In a case where the temperature increase/decrease rate of the ultracold thermostatic bath was low (0.5° C./min), the composition started melting within the low temperature range from −75° C. to −40° C. with good repeatability but exhibited some variation in melting behavior. Meanwhile, in a case where the temperature increase/decrease rate of the ultracold thermostatic bath is low (2.5° C./min), the composition exhibited extremely poor repeatability.

The above results reveal that the cold storage material composition in accordance with one or more embodiments of the present invention, which composition can substitute for dry ice, (i) maintains a certain melting point within the range from −75° C. to −40° C. for a long period of time with good repeatability and (ii) has less variation in melting point and melting behavior, and therefore can stably realize cold storage.

Examples 8 Through 16

In each of Examples 8 through 16, an aqueous solution containing the metal salt (A) and the inorganic salt (B) in respective amounts (mol %) shown in Table 4 was prepared as the cold storage material composition. Then, each of thickeners shown in Table 3 was added to a resultant aqueous solution in an amount (% by weight) shown in Table 4, and a resultant mixture was stirred well until the resultant mixture changed into a gel-like form.

A resultant gel-like composition was measured and evaluated with use of the ultracold thermostatic bath. Note that the temperature increase/decrease rate was fixed to 1.0° C./min, except for Example 16 for which the temperature increase/decrease rate was set to 0.5° C./min.

TABLE 3

| | Name of Substance | Abbreviation | Name of Product | Manufacturer |
|---|---|---|---|---|
| Ionic | Carboxymethyl Cellulose | CMC | CMC DAICEL | Daicel FineChem Ltd. |
| | Carboxy Vinyl Polymer | Carbomer | AQUPEC HV-805EGGM | Sumitomo Seika Chemicals Co., Ltd, |
| | Copolymer of N-vinylacetamide and Sodium Acrylate | | GE167-000 | Showa Denko K.K. |
| Nonionic | Hydroxypropyl Methylcellulose | HPMC | METOLOSE 90SH-30000 | Shin-Etsu Chemical Co., Ltd. |
| | Hydroxypropyl Cellulose | HPC | HPC | Nippon Soda Co., Ltd, Daicel FineChem Ltd. |
| | Cellulose Fiber | | CELISH | Wako Pure Chemical Industries, Ltd. |
| | Pectine | | | |
| | Guar Gum | | SUPERGEL 200 | SANSHO Co., LTD |
| | Dextrin | | MALTRIN M100 | SANSHO Co., LTD |
| | Polyvinyl Pyrrolidone | | Polyvinylpyrrolidone K 30 | Tokyo Chemical Industry Co., Ltd. |
| | Hydroxyethyl Cellulose | HEC | HEC DAICEL | Daicel FineChem Ltd. |

TABLE 4

| | | Eutectic Point With Water (° C.) | | Example 8 | Example 9 | Example 10 | Example 11 | Example 12 |
|---|---|---|---|---|---|---|---|---|
| Metal Salt (A) | Calcium Chloride | −55.0 | mol % | 5.6 | 5.6 | 5.6 | 5.6 | 5.6 |
| Inorganic Salt (B) | Sodium Chloride | −21.2 | | 1.9 | 1.9 | 1.9 | 1.9 | 1.9 |
| | Ammonium Chloride | −15.4 | | — | — | — | — | — |
| | Potassium Chloride | −10.9 | | — | — | — | — | — |
| Inorganic Salt (C) | Magnesium Chloride | −33.6 | | — | — | — | — | — |
| Thickener | Hydroxyethyl Cellulose (High Viscosity Type) | | wt % | — | 2 | 1 | 0.5 | 0.3 |
| | Hydroxyethyl Cellulose (Low Viscosity Type) | | | | | | | |
| | Guar Gum | | | — | — | — | — | — |
| Evaluation Result | <Temperature Increase/Decrease Rate: 1.0° C./min> | Melting Start Point | ° C. | −51.6 | −54.4 | −54.7 | −53 | −51.6 |
| | | Fixed-temperature Stability | — | Present | Present | Present | Present | Present |
| | | Maintenance Time | min | 17 | 14 | 16 | 14 | 14 |
| | | Repeatability | — | E | E | E | E | E |
| | | Gelation Stability | — | E | E | E | E | E |

TABLE 4-continued

|  |  |  |  | Example 13 | Example 14 | Example 15 | Example 16 |
|---|---|---|---|---|---|---|---|
| Volume Expansion | | — | — | None | None | None | None | None |
| Practicality Evaluation | | | | E | E | E | E | G |

|  |  | Eutectic Point With Water (° C.) |  | Example 13 | Example 14 | Example 15 | Example 16 |
|---|---|---|---|---|---|---|---|
| Metal Salt (A) | Calcium Chloride | −55.0 | mol % | 5.6 | 5.6 | 5.6 | 5.6 |
| Inorganic Salt (B) | Sodium Chloride | −21.2 | | 0.9 | 1.9 | 1.9 | 1.9 |
| | Ammonium Chloride | −15.4 | | — | — | — | — |
| | Potassium Chloride | −10.9 | | — | — | — | — |
| Inorganic Salt (C) | Magnesium Chloride | −33.6 | | — | — | — | — |
| Thickener | Hydroxyethyl Cellulose (High Viscosity Type) | | wt % | 0.7 | — | — | — |
| | Hydroxyethyl Cellulose (Low Viscosity Type) | | | — | 2 | 1 | — |
| | Guar Gum | | | — | — | — | 1 |
| Evaluation Result | <Temperature Increase/Decrease Rate: 1.0° C./min> | Melting Start Point | ° C. | −52.8 | −54 | −53.9 | −50.8 |
| | | Fixed-temperature Stability | — | Present | Present | Present | Present |
| | | Maintenance Time | min | 12 | 14 | 15 | 16* |
| | | Repeatability | — | E | E | E | E |
| | | Gelation Stability | — | E | E | E | G |
| | Volume Expansion | — | — | None | None | None | None |
| | Practicality Evaluation | | | E | E | E | G |

*Temperature Increase/Decrease Rate: 0.5° C./min

Each of the thickeners shown in Table 3 was added to the composition of Example 5 shown in Table 1 in an amount of 1% by weight relative to the aqueous solution, and a resultant composition was subjected to evaluation of gelation stability. As a result, hydroxyethyl cellulose was evaluated as Excellent (E), guar gum was evaluated as Good (G), dextrin and polyvinyl pyrrolidone were each evaluated as Fair (F), and other thickeners were each evaluated as Poor (P).

Therefore, an amount of hydroxyethyl cellulose, which was evaluated as Excellent (E), was studied by use of ratios shown in Table 4. Table 4 clearly indicates that in each of Examples 8 through 15, in which nonionic hydroxyethyl cellulose was employed as the thickener, a uniform gel-like cold storage material composition obtained (i) maintained a certain melting point within the range from −75° C. to −40° C. with good repeatability and (ii) had little variation in melting point and melting behavior. Although Example 16 in which nonionic guar gum was employed as the thickener was evaluated as Good (G) in terms of gelation stability, the composition (i) maintained a certain melting point within the range from −75° C. to −40° C. with good repeatability and (ii) had little variation in melting point and melting behavior.

The above results reveal that the cold storage material composition in accordance with one or more embodiments of the present invention, in which hydroxyethyl cellulose is employed as the thickener, (i) maintains a certain melting point within the range from −75° C. to −40° C. with good repeatability and (ii) has less variation in melting point and melting behavior, and therefore can most stably achieve cold storage. Furthermore, such a cold storage material composition has little volume expansion while being frozen. Therefore, the cold storage material composition containing hydroxyethyl cellulose can be said to be highly practical.

The constituent elements described in the above embodiment are not limited to the combinations thereof described in the above embodiment, but can be combined in any appropriate manner.

The above embodiment is merely illustrative of the present invention, and is in no way intended to limit the present invention thereto. The present invention can be altered in many ways by a skilled person, and therefore the scope of the present invention is defined only by the claims and equivalents thereof.

The present invention is applicable to chemicals, foods, and technologies related thereto, medical technologies, as well as various fields that require transport or control that involves keeping or maintaining a temperature of an article within a range lower than a range of temperatures of a freezer.

REFERENCE SIGNS LIST

10: Cold storage material
11: Cap of cold storage material
20: Cold storage material composition
40: Transport container
41: Box
410: Opening of box
411: Bottom surface of box
412: Lateral surface of box
42: Lid of box
5: Space for housing temperature control target article
6: Spacer

What is claimed is:

1. A cold storage material composition, comprising:
   1 mol % to 10 mol % of a metal salt; and
   0.5 mol % to 5 mol % of an inorganic salt,
   wherein the metal salt is one or more selected from the group consisting of calcium chloride, zinc chloride, and potassium hydroxide,
   wherein the inorganic salt is one or more selected from the group consisting of a chloride salt, a sulfate salt, a nitrite salt, an iodide salt, a hydrate, and a bromide salt,
   wherein a eutectic point of the metal salt and water is −75° C. to −40° C.,
   wherein a eutectic point of the inorganic salt and water is −30° C. or higher, and
   wherein the cold storage material composition is an aqueous solution and has a melting start point within a range from −75° C. to −40° C.

2. The cold storage material composition according to claim 1, wherein the metal salt is calcium chloride.

3. The cold storage material composition according to claim 1, wherein the inorganic salt is chloride salt.

4. The cold storage material composition according to claim 3, wherein the chloride salt is at least one selected from the group consisting of sodium chloride, ammonium chloride, and potassium chloride.

5. The cold storage material composition according to claim 1, further comprising a thickener.

6. The cold storage material composition according to claim 5, wherein the thickener is a nonionic thickener.

7. The cold storage material composition according to claim 6, wherein the thickener is at least one selected from the group consisting of guar gum, dextrin, polyvinyl pyrrolidone, and hydroxyethyl cellulose.

8. The cold storage material composition according to claim 6, wherein the thickener is hydroxyethyl cellulose.

9. The cold storage material composition according to claim 1, wherein the inorganic salt is one or more selected from the group consisting of sodium chloride, ammonium chloride, potassium chloride, ammonium sulfate, potassium nitrite, potassium iodide, sodium hydrate, and sodium bromide.

10. A cold storage material, comprising the cold storage material composition according to claim 1.

11. A transport container, comprising the cold storage material according to claim 10.

* * * * *